United States Patent [19]

Shotkin

[11] 3,965,848

[45] June 29, 1976

[54] FEVER INDICATOR

[75] Inventor: Robert Shotkin, Millburn, N.J.

[73] Assignee: Becton, Dickinson and Company, East Rutherford, N.J.

[22] Filed: Jan. 31, 1975

[21] Appl. No.: 545,992

Related U.S. Application Data

[63] Continuation-in-part of Ser. No. 409,819, Oct. 26, 1973.

[52] U.S. Cl. .............................. 116/114.5; 73/358
[51] Int. Cl.² ........................................ G01K 11/06
[58] Field of Search ..................... 73/358; 116/114.5

[56] References Cited
UNITED STATES PATENTS

| | | | |
|---|---|---|---|
| 945,978 | 1/1910 | Nielsen et al. | 73/358 X |
| 2,788,282 | 4/1957 | Hammond | 116/114.5 |
| 2,915,405 | 12/1959 | Hammond et al. | 116/114.5 |
| 3,090,236 | 5/1963 | Nicol | 73/358 |
| 3,290,942 | 12/1966 | Carbaugh et al. | 73/358 |
| 3,518,961 | 7/1970 | Kovac | 116/114.5 |
| 3,548,780 | 12/1970 | Kliewer | 116/114.5 |
| 3,713,416 | 1/1973 | Volk | 116/114.5 |
| 3,872,822 | 3/1975 | Ayres | 116/114.5 |

*Primary Examiner*—Richard C. Queisser
*Assistant Examiner*—Frederick Shoon
*Attorney, Agent, or Firm*—Kane, Dalsimer, Kane, Sullivan and Kurucz

[57] ABSTRACT

A disposable fever indicator is provided to determine whether or not a predetermined body temperature has been reached. The indicator comprises a vessel containing therein a movable member and means for exerting a force to move the member from a first position to a second position. The indicator further includes meltable bonding means disposed within the vessel and adapted to overcome the force exerted by the aforementioned means and keep the member in the first position until the predetermined temperature is reached at which time the bonding means melts and allows the member to move to the second position under the action of the force exerting means. The indicator is armed only prior to usage. Prior to arming the device, even if the predetermined temperature is reached or exceeded, the movable member will remain in the first position.

2 Claims, 9 Drawing Figures

FEVER INDICATOR

CROSS REFERENCE TO OTHER APPLICATIONS

The present application is a continuation-in-part of application Ser. No. 409,819, filed Oct. 26, 1973.

BACKGROUND OF THE INVENTION

The present invention relates to a fever indicator and more particularly to a device adapted to readily determine whether or not a predetermined temperature has been reached or exceeded.

As distinct from a thermometer which is an indication of temperature over a particular range, a fever indicator serves to determine whether or not a predetermined temperature has been reached or exceeded. Such indicators are extremely useful, for example, where a mass-testing program is underway to separate the few individuals who may have temperature requiring further testing with a clinical thermometer from the masses who are healthy. For this purpose, it is especially desirable that the fever indicator be constructed in a manner that renders it sufficiently inexpensive so that it can be disposed of after a single use. In addition, since the indicator to a large extent serves as a go-no-go gauge, it is important that the indicator accurately provide indication of whether or not a patient's temperature is in excess of a safe maximum. For most purposes, a safe maximum will range between 99°–99.5°F.

In the view of the above, it is the principal object of the present invention to provide an accurate gauge of whether or not a particular, predetermined temperature has been exceeded by a patient. A further object is to provide such a gauge which can be mass produced at a cost sufficiently low to render the gauge disposable after a single use. A still further object is to provide such a gauge which must be armed prior to use and which, prior to arming, is not affected by temperature change even if the predetermined temperature is exceeded.

SUMMARY OF THE INVENTION

The above and other beneficial objects and advantages are attained in accordance with the present invention by providing a fever indicator for determining temperatures above a predetermined value comprising a vessel containing therein a movable member and means adapted to be armed to exert a force to move the member from a first position to a second position. The indicator further includes meltable bonding means enclosed within the vessel and adapted to overcome the force exerted by the aforementioned means to keep the member in the first position until the predetermined temperature is reached at which time the bonding means melts and thus allows the member to move under the action of the force exerting means to the second position. The nature of the relationship between the vessel and member is such that prior to "arming" of the thermometer, even if the predetermined temperature is reached or exceeded, the member will not move. A visual inspection of the indicator showing the member in the second position thus provides indication that the predetermined temperature has been reached or exceeded.

DETAILED DESCRIPTION OF THE PREFERRED EMBODIMENTS

Figure 1:
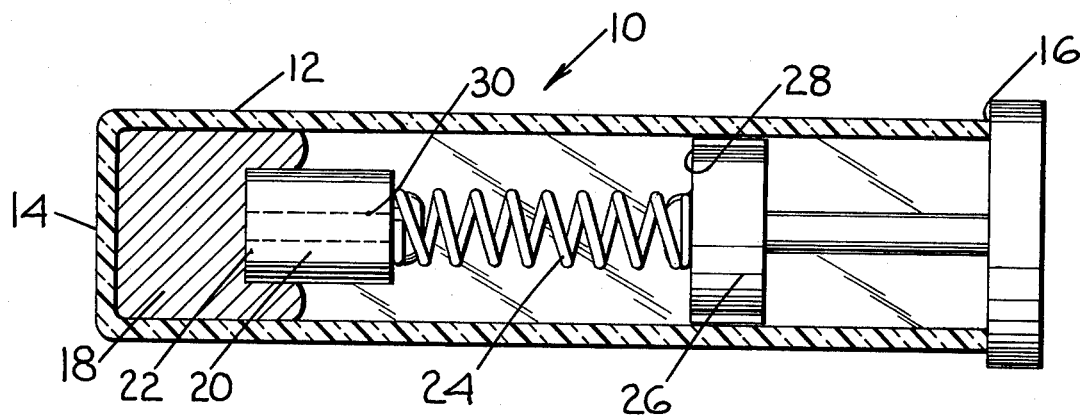
FIG. 1 is a diagrammatic side elevational view of a first embodiment of a fever indicator in accordance with the present invention shown in an unarmed state.

Reference is now made to the drawings wherein similar components bear the same reference numerals throughout the several views. Accordingly, in FIG. 1, the fever indicator 10 comprises an elongated, transparent or translucent container or vessel 12 closed at one end 14 and open at the opposite end 16. The container if formed of a material with relatively good heat conduction characteristics so as to minimize the time required for a reading and further must be chemically inert and compatible with human usage without adverse effects. To this end, glass and various plastics such as polyethylene, polypropylene and polystyrene are satisfactory and have the further advantage of being sufficiently inexpensive so as to keep down the cost of the fever indicator.

Contained in the base of the vessel 12 adjacent closed end 14 is a quantity of a heat meltable solid 18 such as a paraffin or wax. The solid chosen is one whose melting point is at the predetermined temperature sought to be detected. As stated, for purposes of a fever indicator, this temperature should be between 99° and 99.5°F. In addition to having the desired melting point, it is important that the meltable solid chosen have a sharpness of melting and low heat of fusion as well as good heat transfer properties to insure rapid melting once the melting point has been reached thereby minimizing the time the fever indicator must remain in the mouth or other selected site of a patient.

Contained within the vessel and constrained from movement by the solidified meltable material 18 is a movable member in the form of piston 20. Piston 20 has portions 22 embedded in the solidified meltable material thereby forming a bond therebetween. In addition, as shown, the meltable material completely fills the lower portion of the container and contacts the interior surfaces of the container over an extended area thereby forming a secure bond between the solidified meltable material and the container. In this manner, piston 20 is constrained from movement with respect to the container by the bonding action of the solidified meltable material.

Figure 4:
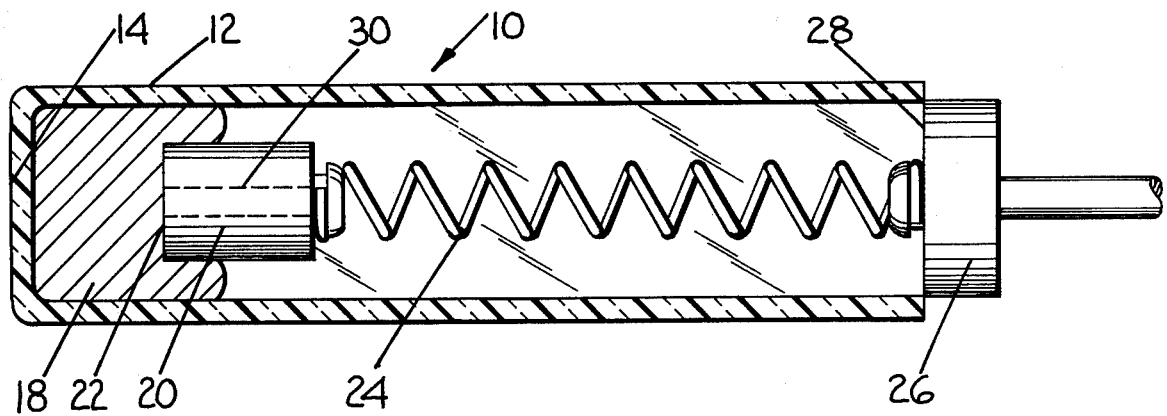
FIG. 4 is a view similar to FIG. 1 showing the fever indicator of FIG. 1 in the armed state.
Figure 7:
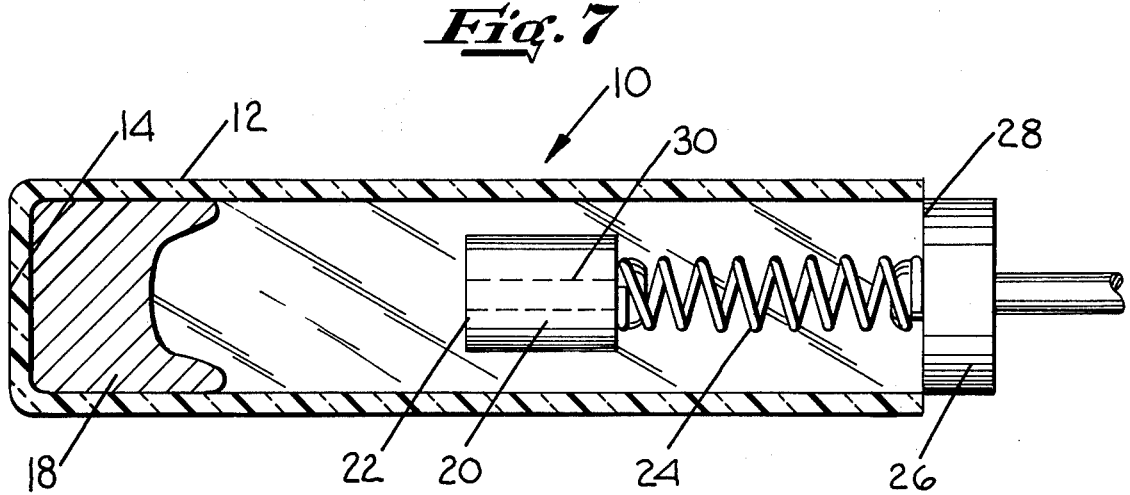
FIG. 7 is a view similar to FIG. 1 showing the fever indicator of FIG. 1 after the predetermined temperature is exceeded.

A spring 24 is also contained within vessel 12 affixed to piston 20. As will be described forthwith, the spring is adapted to be stressed so as to exert a force on the piston tending to separate the piston from the solidified meltable material. In this connection, one end of spring 24 is affixed to the rear of piston 20 and the other end is affixed to a plunger 26. Prior to using the temperature indicator, the plunger must be withdrawn from the open end 16 of the container until the plunger forward edge 28 rests on the container rim (as shown in FIG. 4). This serves to arm the indicator by prestressing the spring so that if the material 18 is melted and releases its hold on piston 20, the spring serves to draw the piston toward the vessel open end 16 (as shown in FIG. 7). To this end, the piston is provided with a vent hole 30 to facilitate its movement through the container. The movement of the piston serves as indication that the predetermined temperature has been reached or exceeded.

Figure 2:
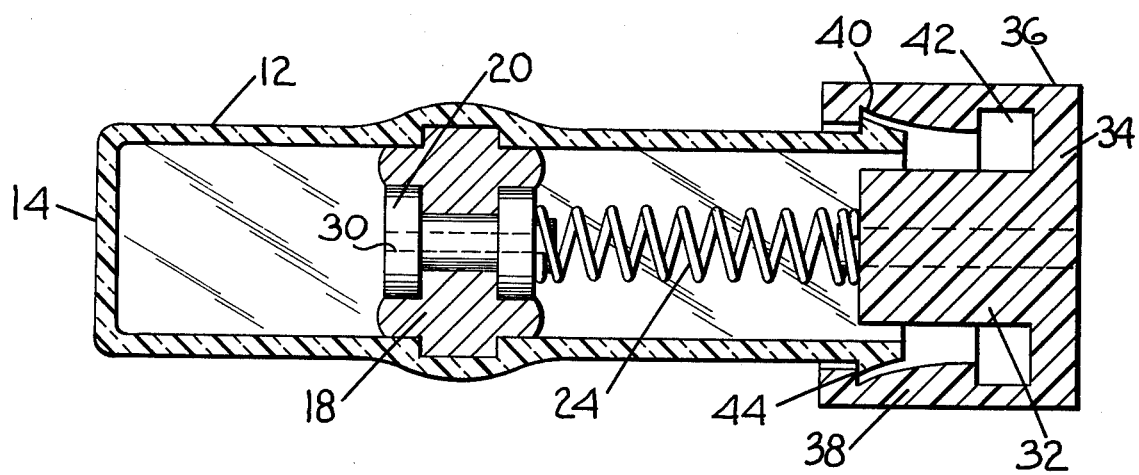
FIG. 2 is a second embodiment of a fever indicator in accordance with the present invention shown in an unarmed state.

In an alternate embodiment of the invention illustrated in FIG. 2, the solidified, meltable material 18 is used to hold piston 20 in an intermediate position within the container. Spring 24 has one end abutting the rear of piston 20 and the other end affixed to a stem 32 extending into the container from the midpoint of the cover portion 34 of a closure cap 36 for container 12. The cap 36 further includes an apron 38 extending from the periphery of the cover portion 34 and designed to ride on the outside of container 12. Cover 36 is provided with first and second indents 40 and 42 respectively spaced along the length of the cap.

Figure 5:
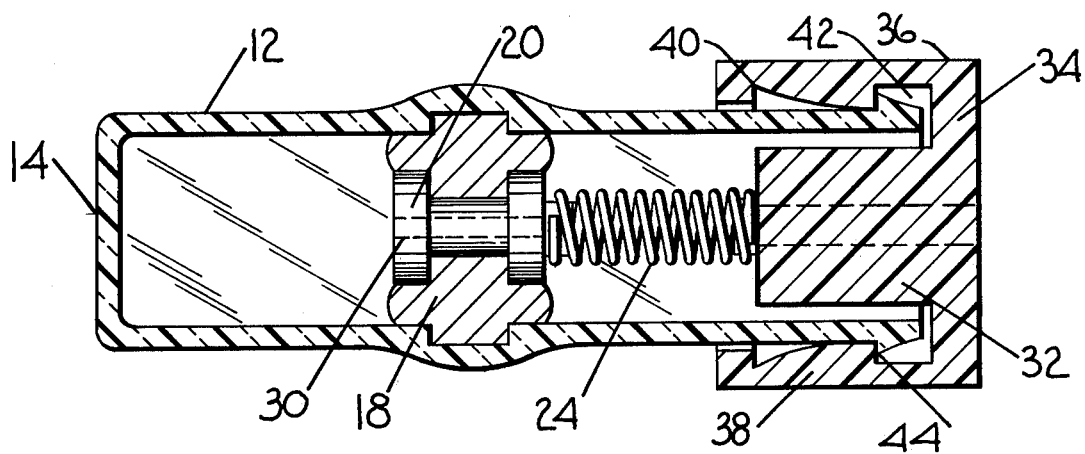
FIG. 5 is a view similar to FIG. 2 showing the fever indicator of FIG. 2 in the armed state.
Figure 8:
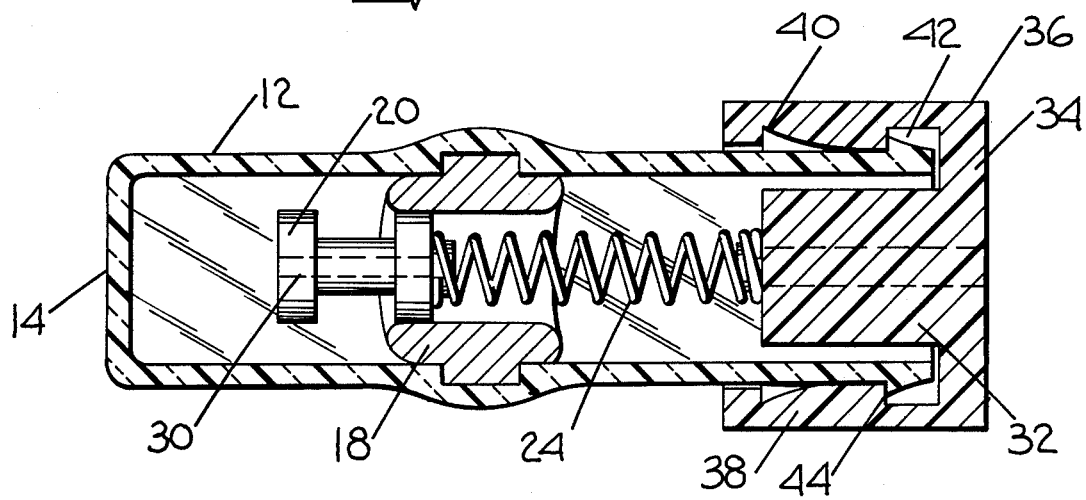
FIG. 8 is a view similar to FIG. 2 showing the fever indicator of FIG. 2 after the predetermined temperature is exceeded; and, FIG. 9 is a view similar to FIG. 3 showing the fever indicator of FIG. 3 after the predetermined temperature is exceeded.

In this embodiment, the temperature indicator is in an inactive state when in the position illustrated in FIG. 2. Prior to use, however, the indicator is armed by pushing the cap inwardly until the rim 44 about the container open end rides into the second indent 42 at which time stem 32 serves to compress spring 24 so that the spring in turn exerts a pushing force on piston 20 (as shown in FIG. 5). Thus, if the solidifying material 18 is melted so that it releases its hold on piston 20, the spring tends to urge the piston from the position shown to a second position toward the closed end of the container (as shown in FIG. 8).

Figure 3:
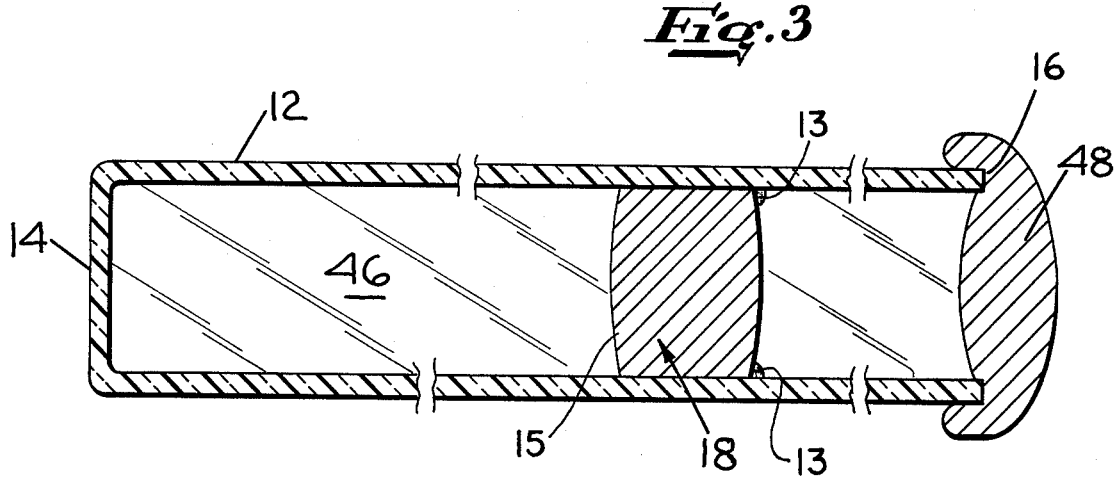
FIG. 3 is a third embodiment of a fever indicator in accordance with the present invention shown in an unarmed state.
Figure 6:
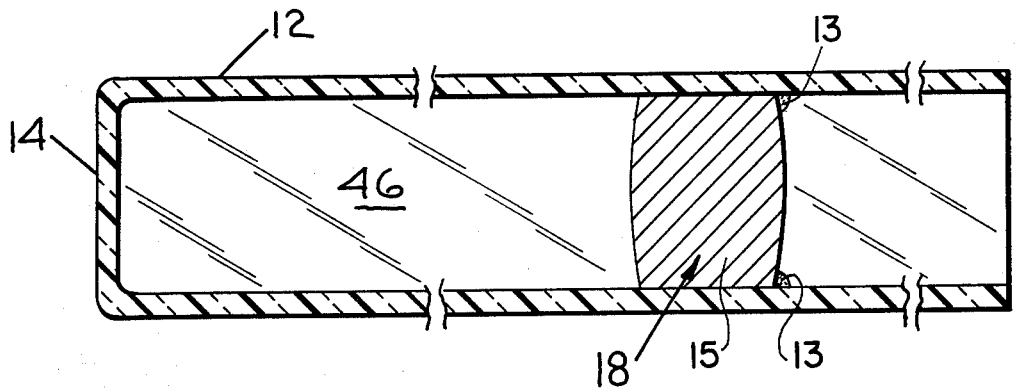
FIG. 6 is a view similar to FIG. 3 showing the fever indicator of FIG. 3 in the armed state.
Figure 9:
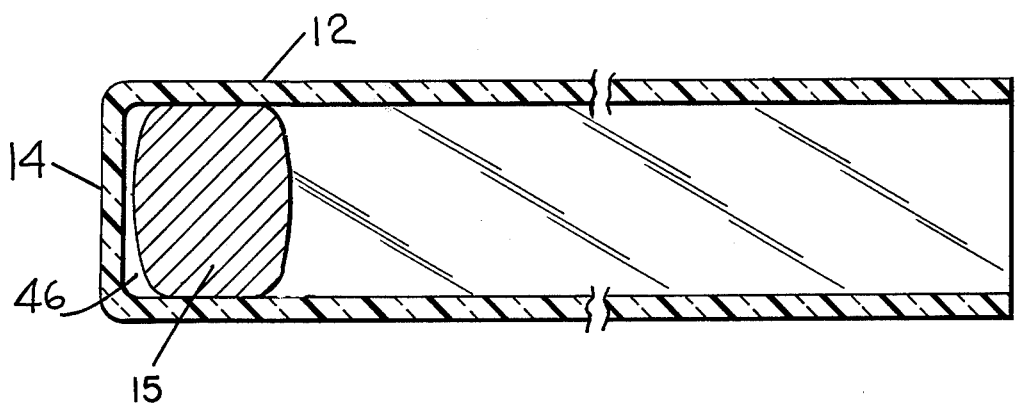

In the third embodiment shown in FIG. 3, a plug 18 comprising a non-meltable piston 15 dimensioned to lightly engage the interior of the container and bonded in place by a meltable bonding substance 13 is positioned within container 12 between the container closed end 14 and open end 16. The open end 16 of the container is sealed by a removable plug and the container is evacuated so that a partial vacuum exists on both sides of plug 18. In this embodiment the device is armed by removing cap 48 (as shown in FIG. 6). If, after the cap 48 is removed, the bonding substance 13 is melted so that its bond with the container walls is broken, the pressure differential between the open container end and vacuum in portion 46 tends to suck the piston 15 into the vacuum (as shown in FIG. 9) indicating a fever condition. If prior to use, the thermometer is exposed to a temperature sufficiently high to melt the bonding substance 13 and if the plug were properly oriented so that gravity would cause the plug to run, a similar inadvertent reading would occur. Accordingly, means must be provided to insure that the plug will not move unless the cap 48 is first removed. To this end, the vessel or container 12 may be in the form of a capillary tube so that even if the plug piston bonding substance 13 were to melt completely, the piston would remain in position (until forced to move by the force of the vacuum after cap 48 was removed). Alternately, the plug could comprise a meltable material dimensioned to engage the interior of the container.

In each of the above examples, it will be noted that prior to the arming of the temperature indicator it remains unaffected by exposure to elevated temperatures. Thus, the indicators may be shipped or stored without fear of their becoming spent. Once the temperature indicator is armed, however, exposure of the indicator to a temperature at or above the melting point of the solidified, meltable material 18 causes a break in the bond formed by the solidified material after which a force exerting means shifts a member (piston 20 in FIGS. 1 and 2 and the meltable material 18 itself in FIG. 3) causing the member to shift from a first position to a second position. This shift in position which is detectable by virtue of the container's transparency or translucency is indicative that the predetermined temperature has been reached or exceeded. In this regard, if a translucent material is used for the container the movable member should be colored a contrasting color so as to render it visible. As previously stated, by properly choosing materials so that their melting point is at the threshold of fever (99°F–99.5°F) the present indicator serves as an effective means for determining that the patient under observation has a fever the exact temperature of which would then be determined by measuring with a conventional clinical thermometer.

Thus, in accordance with the above, the aforementioned objectives are effectively attained.

Having thus described the invention, what is claimed is:

1. A fever indicator for determining temperatures above a predetermined value comprising:
   a vessel having walls, a closed end, and an open end;
   a plug member disposed for movement within said vessel;
   means bonding said plug within said vessel at a first position spaced apart from said vessel closed end in airtight relationship with said vessel walls, said bonding means comprising a material meltable at or above said predetermined temperature;
   a portion of said vessel between said closed end and plug, said portion being evacuated of air;
   a removable closure over said vessel sealing said open end; and,
   a second portion of said vessel extending between said plug and said open end, said vessel second portion being evacuated of air.

2. The indicator in accordance with claim 1 wherein said vessel comprises a capillary tube.

* * * * *